April 15, 1930.  J. L. RAY  1,754,904
BEARING HOUSING
Filed June 3, 1927
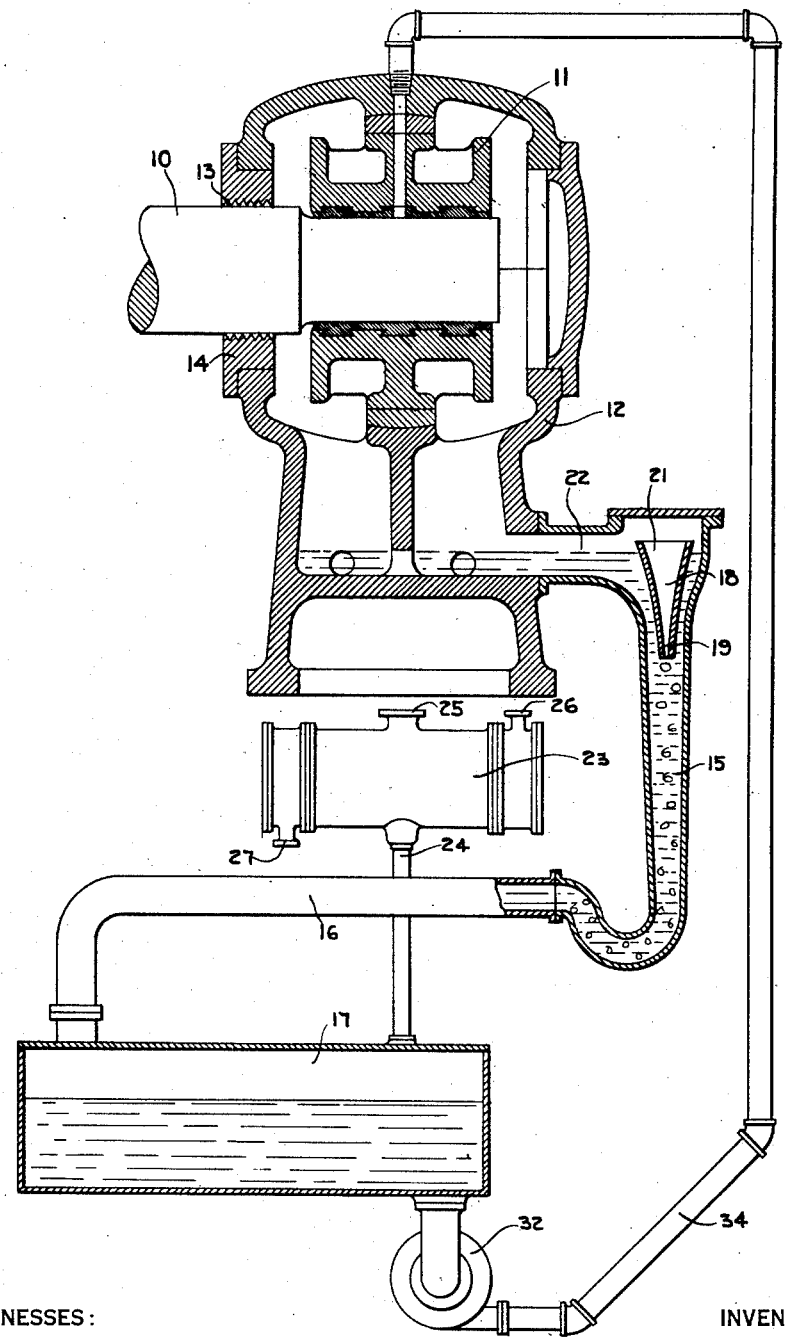
WITNESSES:
E. Lutz.
INVENTOR
J. L. Ray
BY
A. B. Reavis
ATTORNEY Patented Apr. 15, 1930

1,754,904

UNITED STATES PATENT OFFICE

JAMES L. RAY, OF SWARTHMORE, PENNSYLVANIA, ASSIGNOR TO WESTINGHOUSE ELECTRIC & MANUFACTURING COMPANY, A CORPORATION OF PENNSYLVANIA

BEARING HOUSING

Application filed June 3, 1927. Serial No. 196,249.

My invention relates to a bearing housing for a rotating shaft, and it has for its object to provide an improved means for withdrawing lubricant vapor from the housing.

The term "lubricant vapor" is used in a broad sense in this specification, and is intended to embrace both the lubricant which has been transformed into the true gaseous state and also the atomized or finely divided suspended particles which form a mist.

In a bearing for a large machine, such as the bearing of a turbo-generator, a substantial amount of lubricant is vaporized or atomized in the bearing. It is desirable to retain this vapor, both to conserve the lubricant and to prevent injury to means with which the bearing is associated.

The lubricant vapor consists mainly of atomized or finely divided lubricant particles in a suspended state, and partly of lubricant in fully vaporized state. As is well known, if the small particles of liquid lubricant in suspension are brought into contact with each other or with a body of liquid lubricant, they unite or coalesce to form a liquid body.

In accordance with my invention I place the lubricant, which has been transformed into the true gaseous state in the bearing housing, in intimate contact with liquid lubricant. I preferably do this by entraining the gaseous lubricant in the housing by the stream of lubricant draining from the housing. In this way, the suspended particles of lubricant are united with the body of liquid lubricant and a large portion of the vaporized lubricant is condensed, due to the fact that the lubricant is cooled as it flows away from the bearing housing.

An embodiment of my invention is shown in the accompanying drawings, in which:

The single figure is a diagrammatic view, with parts in section.

Referring to the drawing in detail, I show a shaft 10 rotating in a bearing 11, the latter being supported and enclosed by a bearing housing 12. The bearing housing is provided with an opening 13 through which the shaft projects into the bearing housing, and mounted in this opening is a labyrinth packing gland 14 for minimizing all flow of gaseous media into or out of the bearing housing. The bearing housing is adapted to collect the lubricant discharged from the bearing in the bottom portion thereof; and, communicating with the bottom portion, is a conduit 15 for conducting lubricant to a main drain conduit 16 discharging into the reservoir 17. A funnel-shaped nozzle 18 is disposed in the conduit 15 with its convergent end 19 extending downwardly and with its divergent or larger end 21 uppermost and above the normal liquid level indicated at 22.

The conduit 15 is preferably extended downwardly below the level of the main drain conduit 16 and then bent upwardly to said conduit, thereby forming a vapor trap in said main drain conduit.

If desired, a condenser 23 may be provided, communicating at one side with the upper portion of the reservoir 17, as indicated at 24, and at the opposite side with the atmosphere, as indicated at 25. Cooling fluid for the condenser may be supplied through opening 26 and discharged through opening 27.

Any suitable means may be provided for supplying the lubricant collecting in the reservoir 17 to the bearing for lubricating said bearing. Such a means is shown as a centrifugal pump 32, communicating with the bearing through a conduit 34.

The operation of the above described apparatus is as follows: Lubricant is supplied from the reservoir 17 and it is transmitted by the pump 32 through the conduit 34 to the bearing. The bearing generates a considerable amount of heat, thereby raising the temperature of the lubricant supplied thereto and vaporizing a portion thereof. The rapid rotation of the shaft 10 also atomizes or breaks up into fine liquid particles, another portion of the lubricant. The vaporized and the atomized lubricant mix or diffuse with the air contained in the housing and together constitute the gaseous media in the housing.

The liquid lubricant discharged from the bearing collects in the bottom portion of the housing and flows by gravity through the conduit 15. The lubricant in flowing through the conduit 15 attains a substantial velocity, and this velocity, or flow, as will be readily understood, creates a suction at the lower end of the nozzle 19. The upper or large end 21 of the nozzle is disposed above the normal liquid level and is therefore in communication with the gaseous media in the housing. Such gaseous media is therefore drawn through the nozzle 18 and entrained in the liquid lubricant flowing through the conduit 15.

The gaseous media comes into intimate contact with the body of liquid lubricant and the small particles of suspended lubricant unite with the liquid lubricant. As the lubricant flows away from the housing its temperature is reduced and practically all of the lubricant vapor is condensed and mixes with the liquid lubricant.

Should it be desirable to condense the remaining lubricant vapor, the condenser 23 may be provided, as shown in the drawing. The vapor separated from the liquid in the drain 16 rises to the upper portion thereof and flows through the connection 24 to the condenser 23, where it comes into contact with the cooling surfaces and is condensed thereby. The air and non-condensable gases may then escape to the atmosphere through the vent 25.

From the above description, it will be seen that I have provided a simple and inexpensive means of withdrawing lubricant vapor from a bearing housing, whereby the escape of such lubricant vapor is avoided. No moving parts are required, and therefore no attention on the part of the operator is necessary. This arrangement is particularly desirable in situations where oil vapor may act injuriously. For example, when used with a generator or motor, a bearing of this character substantially prevents the escape of vapor thereinto.

It will be apparent that, while I have shown the nozzle 18 as diverging downwardly, any other form of nozzle might be used. The nozzle is so designed that it will withdraw just sufficient gaseous media to maintain a very slight flow of air into the housing past the packing 14, whereby the escape of any lubricant vapor through said packing is avoided.

While I have shown my invention in but one form, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:

1. The combination with a bearing and a housing therefor, of means for supplying lubricant to said bearing, means for draining from the housing the lubricant discharged from the bearing, and means including an ejector motivated by the flow of said drainage for withdrawing gaseous media contained in said housing.

2. The combination with a bearing and a housing therefor, of means for supplying lubricant to said bearing, means for draining from the housing the lubricant discharged from the bearing, and means including an ejector motivated by the flow of said drainage for withdrawing lubricant contained in said housing in a gaseous state.

3. The combination with a bearing and a housing therefor, of means for supplying lubricant to said bearing, means for draining from the housing the lubricant discharged from the bearing, and an ejector motivated by the flow of the lubricant drainage for entraining gaseous media contained in the housing in said drainage and withdrawing the same from the housing.

4. The combination with a bearing and a housing therefor, of means for supplying lubricant to said bearing, means for draining from the housing the lubricant discharged from the bearing, and an ejector motivated by the flow of the lubricant drainage for entraining lubricant contained in said housing in gaseous state in the drainage and withdrawing the same from the housing.

5. The combination with a bearing of a housing therefor adapted to collect the lubricant discharged from said bearing, a conduit communicating with said housing for withdrawing said discharged lubricant therefrom, a nozzle having its inlet end disposed above the normal liquid level and having its discharge end disposed in said conduit.

6. The combination with a bearing and a housing therefor, of means for supplying lubricant to said bearing, means for draining from the housing the lubricant discharged from the bearing, and an ejector for withdrawing lubricant vapor from the housing, said ejector utilizing the lubricant draining from said housing as motive fluid.

7. The combination with a bearing and a housing therefor, of means for supplying lubricant to said bearing, means for draining from the housing the lubricant discharged from the bearing, and means utilizing the liquid lubricant draining from said housing as a vehicle for conveying lubricant vapor from said housing, said means including an ejector motivated by said liquid lubricant drainage.

In testimony whereof, I have hereunto subscribed my name this 24th day of May, 1927.

JAMES L. RAY.